Figure 8:
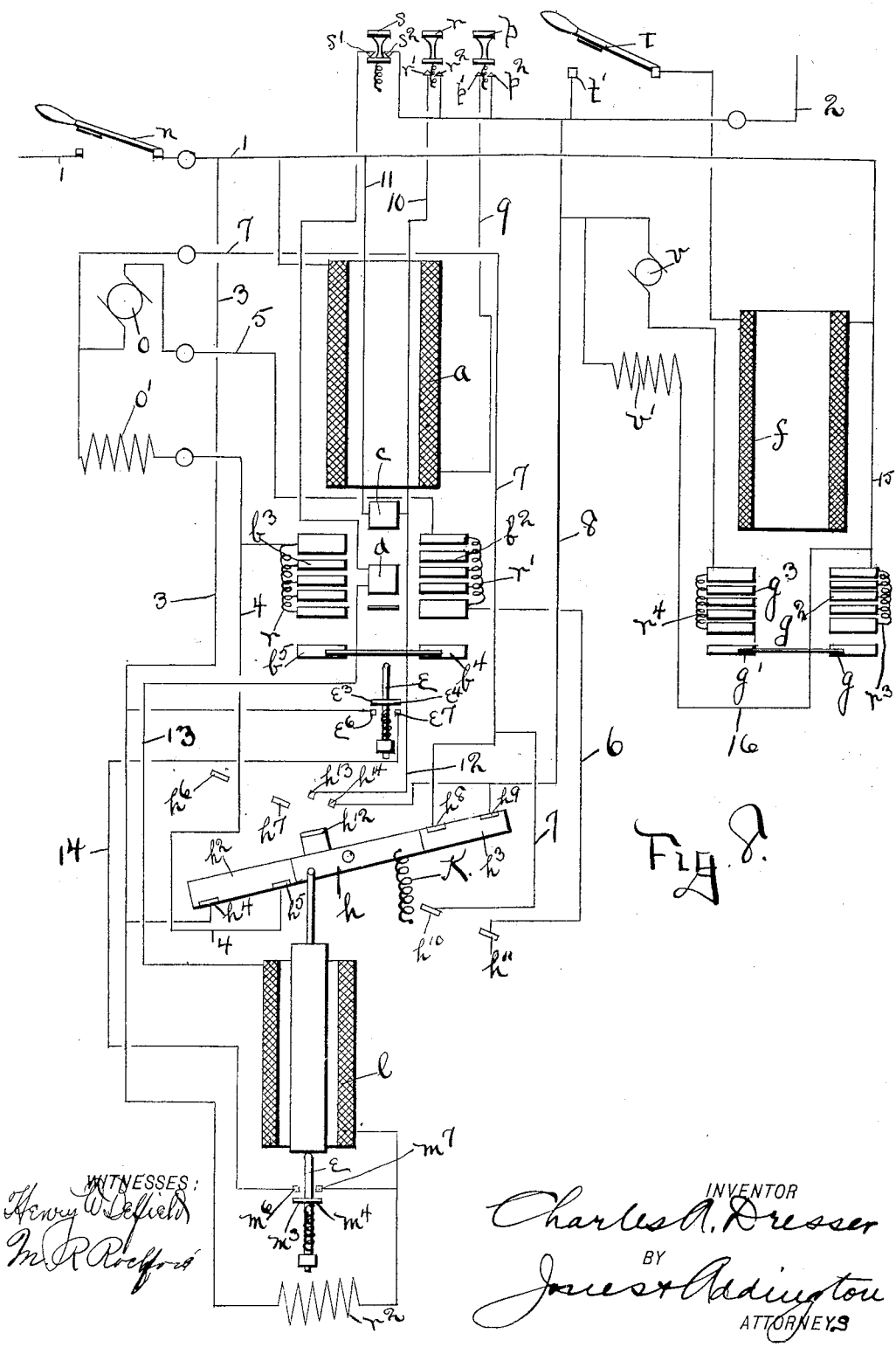

No. 663,491. Patented Dec. 11, 1900.
C. A. DRESSER.
CONTROLLER FOR ELECTRIC MOTORS.
(Application filed May 10, 1900.)
(No Model.) 3 Sheets—Sheet 1.
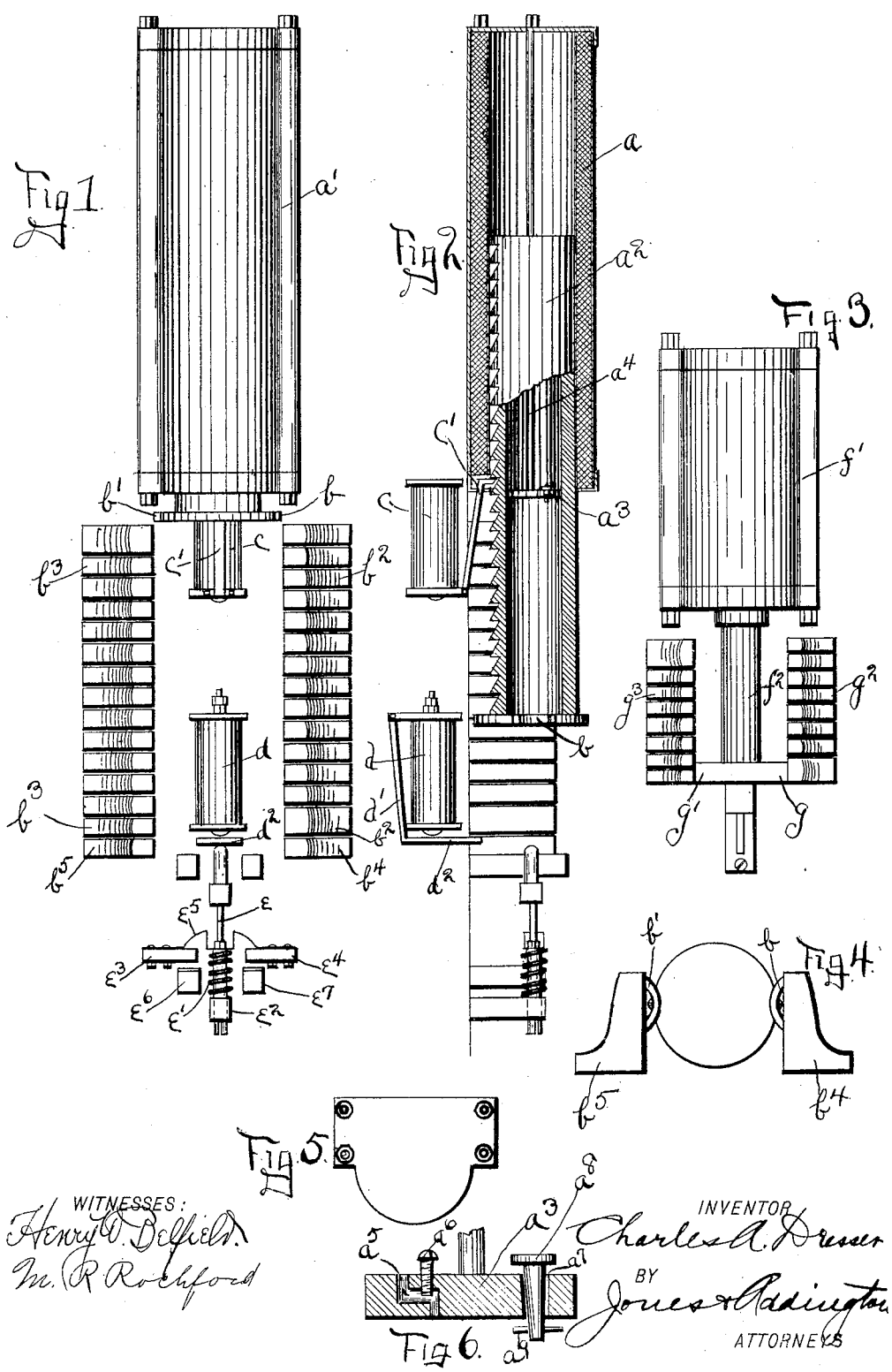

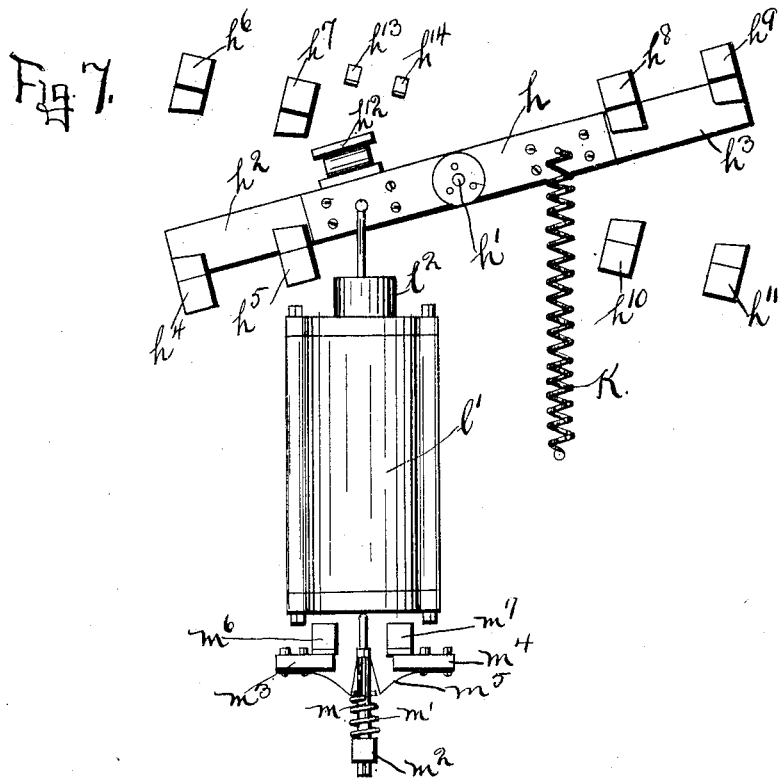

No. 663,491. Patented Dec. 11, 1900.
C. A. DRESSER.
CONTROLLER FOR ELECTRIC MOTORS.
(Application filed May 10, 1900.)
(No Model.) 3 Sheets—Sheet 3.

WITNESSES: INVENTOR
Charles A. Dresser
BY
Jones & Addington
ATTORNEYS

UNITED STATES PATENT OFFICE.

CHARLES A. DRESSER, OF CHICAGO, ILLINOIS, ASSIGNOR TO G. A. EDWARD KOHLER AND FRANKLIN W. KOHLER, OF SAME PLACE.

CONTROLLER FOR ELECTRIC MOTORS.

SPECIFICATION forming part of Letters Patent No. 663,491, dated December 11, 1900.

Application filed May 10, 1900. Serial No. 16,150. (No model.)

*To all whom it may concern:*

Be it known that I, CHARLES A. DRESSER, a citizen of the United States, residing at Chicago, in the county of Cook and State of Illinois, have invented a certain new and useful Improvement in Controllers for Electric Motors, of which the following is a full, clear, concise, and exact description, reference being had to the accompanying drawings, forming a part of this specification.

My invention relates to a controller for electric motors, my object being to provide an improved form of controlling device whereby the operation of an electric motor employed for driving machinery or other apparatus may be regulated as desired.

The apparatus specifically described in the present application has been designed more particularly for the control of electric motors employed in driving printing-presses, and I have illustrated my invention in connection with a controller so adapted in order that my invention may be clearly comprehended. It will be understood, however, that my invention is not limited to the control of motors operated for this purpose, but is equally applicable to the control of motors employed for other purposes.

In driving printing-presses it has been proposed to employ a main and an auxiliary motor, the auxiliary motor being adapted to start the press and bring the same to a definite speed—say one-tenth normal speed—the main motor being coupled with the press, whereby the armature of the main motor is also started by the auxiliary motor. When the main motor has thus been brought to the definite speed, current is supplied thereto and the main motor takes the load and through the agency of an automatic clutch the auxiliary motor is disconnected from the press and may be removed from circuit and brought to rest. The apparatus herein described is particularly applicable for operation in connection with a press adapted to be driven by a main and an auxiliary motor, as above described. In Letters Patent No. 618,071, granted to me January 24, 1899, I have described a form of apparatus for controlling the starting resistance which I preferably employ in connection with the present invention, and in certain particulars the present invention relates to improvements of this apparatus described in my earlier patent.

I have illustrated my invention in the accompanying drawings, in which—

Figure 1 is a view of the controller for controlling the starting resistance of the large motor. Fig. 2 is a sectional view thereof. Fig. 3 is a view of the controller for controlling the small motor. Fig. 4 is a view showing the bars for the rheostat and the contact-brushes. Fig. 5 is a top view of the casing for the solenoids of the controller. Fig. 6 is a sectional view of the piston within the core of the controller. Fig. 7 is a view of the controlling-switch. Fig. 8 is a diagram illustrating the circuit connections.

Like characters refer to like parts in the several figures.

In Fig. 1 I have shown the device for controlling the starting resistance. This comprises a suitable casing $a'$, within which is placed a solenoid $a$, and within the bore of the solenoid a core $a^2$ is adapted to move. The core is hollow, and within the core is a piston $a^3$, held fixedly in position by means of a shaft $a^4$, secured at the upper end. The piston carries a duct $a^5$, the passage through which may be adjusted by means of the screw $a^6$. An opening $a^7$ is also provided through the piston, through which passes the shank of a bolt $a^8$, the head of which is adapted to seal the port when the core is moved in one direction and to be moved upward to unseal the port when the core is moved in the opposite direction. A part $a^9$, passing through the end of the bolt, prevents the withdrawal thereof. The hollow core is filled with oil, and the core and the piston thus constitute a dash-pot, which regulates the movement of the core. At the lower end of the core is provided a pair of brushes $b\ b'$, the brush $b$ being adapted to engage the faces of a series of terminals $b^2$, while the brush $b'$ is adapted to engage the faces of a series of terminals $b^3$. A portion of the coils of the rheostat are connected between the terminals $b^2\ b^2$ and a portion between the terminals $b^3\ b^3$. The lower terminals $b^4\ b^5$ are dead terminals and are not in connection with the coils of the rheostat. As the brushes $b\ b'$ ascend the resistance of the rheostat is gradually cut out, and as the brushes descend the resistance is cut into the circuit. The rear of the core $a^3$ is notched or toothed to form a rack, and the armature $c'$ of a magnet $c$ is adapted to rest by its own weight against this rack to serve as a lock to prevent the downward movement of the core, while permitting the core to move upward freely. When the magnet $c$ is energized, the armature $c'$ is attracted and the end thereof is moved out of engagement with the rack, thus releasing the core and permitting the same to descend.

Beneath the magnet $c$ is another magnet $d$, having a pivoted armature $d'$, the end $d^2$ of which projects into the path of the core $a^2$ when the magnet $d$ is energized. The end $d^2$ is situated at such a height that when the same rests in the path of the core the core is prevented from passing to the dead terminals $b^4$ $b^5$, and the core therefore rests in position to include all of the resistance of the rheostat in circuit. When magnet $d$ is deënergized, the armature $d'$ moves by gravity to carry the end $d^2$ out of the path of the core $a^2$, thereby permitting the same to descend to carry the brushes $b$ $b'$ into contact with the dead terminals. The core $a^2$ when in the lowermost position is adapted to engage a plunger $e$, normally moved upward by means of a coiled spring $e'$, passing through a suitable support $e^2$. Upon the plunger $e$ contact-blocks $e^3$ $e^4$ are carried by means of the spring $e^5$, and when the core $a^2$ descends to its lowermost position the plunger $e$ is pressed downward against the tension of the spring $e'$, thus moving the contact-blocks $e^3$ $e^4$ into engagement with the terminals $e^6$ $e^7$, respectively. When the core $a^2$ is raised again, the spring $e'$ forces the plunger $e$ upward and moves the blocks $e^3$ $e^4$ out of contact with the terminals $e^6$ $e^7$.

In Fig. 3 I have illustrated the controller for the small or starting motor, which likewise comprises a casing $f'$, within which is mounted a solenoid adapted to attract the core $f^2$, carrying at the lower end the brushes $g$ $g'$, adapted to move over the rheostat-terminals $g^2$ $g^3$.

In Fig. 7 I have illustrated the controlling-switch, which comprises an arm $h$, pivoted at $h'$ and carrying contact-plates $h^2$ and $h^3$, the former adapted in one position of the arm $h$ to engage terminals $h^4$ $h^5$ and in the other position to engage the terminals $h^6$ $h^7$. The plate $h^3$ is adapted in one position to engage the terminals $h^8$ and $h^9$ and in the other position to engage the terminals $h^{10}$ and $h^{11}$. The arm $h$ is adapted to be moved in one direction by a coiled spring $k$ and in the other direction by a solenoid mounted within the casing $l'$ and adapted to act upon the core $l^2$, which is connected with the arm $h$. Beneath the solenoid is mounted a plunger $m$, adapted to be pressed upward by means of a coiled spring $m'$, reacting against the stationary abutment $m^2$. Contact-blocks $m^3$ $m^4$ are mounted upon the plunger $m$ by means of a spring $m^5$. When the plunger is in the upper position, the contact-blocks $m^3$ $m^4$ are adapted to engage the terminals $m^6$ $m^7$, respectively. Upon the arm $h$ is carried a contact-block $h^{12}$, adapted in one position of the arm $h$ to engage the terminals $h^{13}$ and $h^{14}$.

In Fig. 8 I have illustrated, diagrammatically, the circuit connections of the apparatus. One of the mains 1 passes through the main switch $n$ and extends thence by conductor 3 to contact $h^4$ of the controlling-switch, and contact $h^5$ thereof is connected by conductor 4 with one end of the series of resistances $r$ and also with the shunt-field $o'$ of the large or main motor. One side of the armature $o$ of the main motor is connected by conductor 5 with the end of resistance $r'$ of the rheostat, the opposite end of said resistance $r'$ being connected by conductor 6 with the contact $h^{11}$. The contacts $h^8$ and $h^{10}$ are connected by conductor 7 with the opposite side of the armature $o$ of the main motor. The contact $h^6$ is a dead contact, while the contact $h^9$ is connected by conductor 8 with the opposite main 2 of the supply-circuit. The solenoid $a$ is connected at one side to the main 1 and at the other side is connected by conductor 9 with contact $p'$ of push-button $p$. When the push-button $p$ is depressed, the same closes together contacts $p'$ and $p^2$, the latter being connected with the opposite main 2. A circuit through solenoid $a$ will thus be closed by depressing push-button $p$. Push-button $r$ is adapted when depressed to connect together contacts $r'$ and $r^2$, the latter being connected with main 2, while the former is connected by conductor 10 with the releasing-magnet $c$, the opposite end of said releasing-magnet being connected by conductor 11 with main 1. From the side of magnet $c$ to which the conductor 10 is connected extends conductor 12 to contact $h^{13}$. Contact $h^{14}$ is connected with conductor 8, which extends to main 2. Push-button $s$ normally closes together contacts $s'$ $s^2$, the latter being connected with main 2, while the former is connected by conductor 13 through magnet $d$ and solenoid $l$. A resistance $r^3$ is connected between one end of solenoid $l$ and the conductor 3, which extends to main 1. One end of solenoid $l$ is also connected with contact $m^7$, while the opposite contact $m^6$ is connected by conductor 14 with contact $e^7$, the companion contact $e^6$ being connected with conductor 3.

The solenoid $f$, which operates the small or starting motor, is connected on one side with main 1 and on the other side with the switch-arm of a switch $t$, adapted to make contact with a terminal $t'$, connected with the main 2. The conductor 1 is also connected by conductor 15 with one end of resistance $r^3$, while the resistance $r^4$ is connected with one side of the armature $v$ of the small motor, the opposite side of said armature being connected with the main 2. The shunt-field $v'$ of the small motor is connected by conductor 16 with conductor 15, while the opposite side of said field is connected with main 2.

I will now describe the operation of the apparatus of my invention. When it is desired to start the press, the main switch $n$ is closed, and circuit is thus closed through solenoid $l$, thereby energizing the same and moving the arm $h$ into the position shown in Fig. 8. At the time the solenoid $l$ is energized core $a^2$ will be at the lower end of its travel and circuit will be closed between contacts $e^3$ $e^6$ and between contacts $e^4$ and $e^7$. Likewise, since the core of solenoid 1 is at the upper end of its travel, contacts $m^3$ and $m^6$ will be connected together, as will also contacts $m^4$ and $m^7$. The circuit through the solenoid $l$ may thus be traced from main 1 over conductor 3, contacts $e^6$ $e^3$, contacts $e^4$ $e^7$, conductor 14, contacts $m^6$ $m^3$ and $m^4$ $m^7$ through solenoid $l$, conductor 13, magnet $d$, and contacts $s'$ and $s^2$ to the opposite main 2. As soon as the core of solenoid $l$ is moved downward plunger $e$ is depressed and contacts $m^3$ $m^4$ will move out of engagement with contacts $m^6$ and $m^7$, respectively. This results in connecting solenoid $l$ in circuit with resistance $r^2$, thereby decreasing the current flowing to a value which is just sufficient to maintain the core of solenoid $l$ in the attracted position. The current in this case instead of passing through the contacts passes direct from conductor 3 through resistance $r^2$ and thence through the solenoid $l$. The controlling-switch having thus been operated to place the parts in readiness for starting the large motor, when desired, the switch $t$ is closed to start the small motor $v$ to thus start the press. Closing the switch $t$ sends current through solenoid $f$, the circuit being traced from conductor 1 through solenoid $f$ and switch $t$ to the opposite main 2. Solenoid $f$ being energized, the core $f^2$ thereof is raised, thus carrying brushes $g$ and $g'$ over the rheostat-terminals and gradually removing the resistance from the circuit of armature $v$, thus permitting the small motor to build up in speed and gradually start the press in motion. When the press is brought to the desired speed, the push-button $p$ is depressed, thus closing circuit through solenoid $a$ and energizing the same, this circuit being traced from conductor 1 through solenoid $a$, conductor 9, and contacts $p'$ $p^2$ to main 2. The energizing of solenoid $a$ will cause the same to attract its core $a^2$, thus carrying brushes $b$ and $b'$ away from the dead terminals $b^3$ $b^5$ and into contact with the live terminals of the rheostat, thereby closing circuit through the large motor, which is thus started. The continued energizing of solenoid $a$ by the depression of push-button $p$ causes the solenoid to ascend, thus gradually cutting out resistance from the armature-circuit and permitting the motor to build up in speed. The brushes may be held at any desired position to introduce the desired amount of resistance in the armature-circuit by releasing the push-button $p$, the armature of magnet $c$ serving to lock the core in the position to which the same has been moved. The circuit through the motor may be traced from main 1 over conductor 3, contacts $h^4$ $h^5$, conductor 4, resistances $r$ $r'$, conductor 5, armature $o$, conductor 7, contacts $h^8$ $h^9$, and conductor 8 to the opposite main 2. A shunted portion of the current passes from conductor 4 through shunt-winding $o'$. When the main motor assumes the load, the small motor may be disconnected from circuit and brought to rest by opening the switch $t$. When it is desired to decrease the speed of operation of the motor—that is, when it is desired to slow down the press—the push-button $r$ is depressed, thus energizing magnet $c$, which thereupon attracts its armature and releases the core $a^2$, permitting the same to descend to gradually cut resistance into the armature-circuit and alter the speed of the armature. The core $a^2$ will continue to descend until its further movement is checked by the end $d^2$ of the armature of magnet $d$, the core being checked in a position wherein all of the resistance of the rheostat is included in the armature-circuit. The circuit through magnet $c$ may be traced from main 1 over conductor 11, through magnet $c$, conductor 10, and contacts $r'$ $r^2$ to main 2. If it be desired to stop the motor entirely, the push-button $s$ is depressed, thus opening the circuit through magnet $d$ and solenoid $l$ and deënergizing the same. The solenoid is thus caused to release its core, and spring $k$ acts to move the switch-arm $h$ to the "off" position, thus opening the motor-circuit. The magnet $d$ being deënergized, the end $d^2$ of the armature thereof is moved backward out of the path of the core $a^2$, thereby permitting the brushes $b$ $b'$ to pass to the dead terminals. The object of the magnet $d$ is to prevent the core $a^2$ from descending to open the armature-circuit at the rheostat, as this would produce destructive arcing. The core is therefore prevented from falling far enough to open the circuit at the rheostat until solenoid $l$ has been deënergized to thereby permit the switch arm $h$ to move to open the armature-circuit. When the arm $h$ occupies the off position, the armature of the motor is connected in a closed circuit with a portion of the resistance of the rheostat, whereby the motor acts as a dynamic brake to check the movement of the mechanism and to bring the motor quickly to rest. In this position the circuit through the armature may be traced over conductor 5, through resistance $r'$, conductor 6, contacts $h^{11}$ $h^{10}$, and conductor 7 back to the armature. When it is desired to bring the press suddenly to rest, as in case of an emergency, the push-button $s$ is depressed without first depressing the push-button $r$. When it is desired to bring the press to rest gradually, the push-button $r$ is first depressed, after which the push-button $s$ is depressed, while for emergency stops the push-button $s$ is alone depressed. The depression of the push-button $s$ opens the circuit through solenoid $l$, thereby permitting the switch-arm $h$ to move quickly to the off position, and the circuit through magnet $d$ being also opened the end of the armature thereof is moved backward out of the path of the core $a^2$. In order that the magnet $c$ may be energized to release the core $a^2$ for the emergency stop, the plate $h^{12}$, carried on the arm $h$, is adapted to engage contacts $h^{13}$ $h^{14}$, thereby closing circuit from main 1 over conductor 11, magnet $c$, and conductors 12 and 8 to main 2. The deënergizing of solenoid $l$ consequently first opens the motor-circuit, after which the core $a^2$ is released, and the core $a^2$ descends to its lowermost position. The descent of the core to its lowermost position depresses the plunger $e$, thereby connecting contacts $e^3$ $e^6$ and contacts $e^4$ $e^7$ to thereby energize solenoid $l$.

Having described my invention, what I claim as new, and desire to secure by Letters Patent, is—

1. The combination with a solenoid, of a hollow core therefor, the movable element of a rheostat controlled by the movement of said core, and a piston within said core to form a dash-pot, substantially as described.

2. The combination with a solenoid, of a hollow core therefor, the movable element of a rheostat controlled by said core, a piston within said core, said core being provided with a rack or series of teeth at one side and a locking device adapted to engage said teeth to maintain the core in any adjusted position, substantially as described.

3. The combination with a solenoid, and a switch for controlling the circuit therethrough, of a hollow core, the movable element of a rheostat controlled by said core, a piston within said core, a rack or series of teeth carried upon said core, a locking device normally engaging said teeth and adapted to permit the core to move to cut out resistance while checking the movement in the opposite direction, a releasing-magnet for retracting said locking device, and a switch for controlling the circuit through said releasing-magnet, substantially as described.

4. The combination with a solenoid and the core thereof, of the movable element of a rheostat controlled by said core and adapted to open the circuit when the core is in the retracted position, an electromagnet and a part controlled thereby adapted to be interposed in the path of said core to prevent the same from moving to the retracted position to open the circuit until the part controlled by said electromagnet is withdrawn from the path of the said core, substantially as described.

5. The combination with a solenoid and the core thereof, of the movable element of a rheostat controlled by said core and adapted in the retracted position of the core to open the circuit, a main switch for opening the circuit, an electromagnet and a part controlled thereby adapted to be interposed in the path of said core to prevent the same from moving to the circuit-opening position until said main switch has been actuated, substantially as described.

6. The combination with a solenoid and the core thereof, of the movable element of a rheostat controlled by said core and adapted in the retracted position of the core to open the circuit, an electromagnet and a part controlled thereby adapted to be interposed in the path of said core to prevent the same from moving to the circuit-opening position, a main or controlling switch, an electromagnet or solenoid for controlling the same and a switch for controlling the circuit through said electromagnets, substantially as described.

7. The combination with a solenoid and the core thereof, of the movable element of a rheostat controlled by said core and adapted in the retracted position of the core to open the circuit, an electromagnet and a part controlled thereby adapted to be interposed in the path of said core to prevent the same from moving to the circuit-opening position, a main switch, an electromagnet or solenoid associated therewith and adapted when energized to close the circuit and a switch for opening the circuit through said electromagnets to deënergize the same and thereby first open the circuit at the switch and subsequently at the rheostat, substantially as described.

8. The combination with a solenoid and the core thereof, of the movable element of a rheostat controlled by said core and contacts adapted to be closed together by weight of said core when in the retracted position and to be separated when the core is attracted by the solenoid, substantially as described.

9. The combination with a solenoid and the core thereof, of the movable element of a rheostat controlled by said core a main or controlling switch, an electromagnet or solenoid for controlling the same, and contacts controlling the continuity of the circuit through said main-switch electromagnet adapted to be closed together when said core is in the retracted position and to be separated when the core is attracted by the solenoid, substantially as described.

10. The combination with a solenoid and the core thereof, of the movable element of a rheostat controlled by said core, a switch for controlling the circuit through said solenoid, a locking device for holding said core in any adjusted position, a releasing-magnet for releasing said locking device, a switch for controlling said releasing-magnet, a main or controlling switch, an electromagnet for controlling the same and a switch for controlling said electromagnet, substantially as described.

11. The combination with a solenoid and the core thereof, of the movable element of a rheostat controlled by said core, a switch for controlling said solenoid, a locking device for said core, a releasing-magnet for controlling the same, a switch for controlling said releasing-magnet, a main or controlling switch, an electromagnet for operating the same, a switch for controlling said electromagnet, and means actuated by the operation of said main or controlling switch for controlling said releasing-magnet, substantially as described.

12. The combination with a solenoid and the core thereof, of the movable element of a rheostat controlled by said core, a switch for controlling said solenoid, a locking device for said core, a releasing-magnet for controlling said locking device, a switch for controlling said releasing-magnet, a main or controlling switch, an electromagnet for controlling the same, an electromagnet for preventing the movement of said core to the circuit-opening position, and a switch for controlling the circuit through said latter-mentioned electromagnet and through the electromagnet which controls the main switch, substantially as described.

13. The combination with an electric motor and the starting resistance therefor, mechanism for cutting in and out said starting resistance, a switch for controlling said mechanism to remove said starting resistance from circuit, a second switch for controlling said mechanism to insert the starting resistance in circuit, a third switch and mechanism controlled thereby for opening the circuit through the motor, substantially as described.

14. The combination with a motor and the starting resistance therefor, of mechanism for cutting the starting resistance into and out of circuit, a push-button or switch adapted when depressed to actuate said mechanism to remove resistance from circuit so long as said push-button is depressed, a second push-button adapted when depressed to insert resistance in the motor-circuit, a third push-button and mechanism associated therewith adapted when said push-button is depressed to open the circuit through the motor, substantially as described.

15. The combination with an electric motor, and the starting resistance therefor, of mechanism for cutting said resistance into and out of circuit, a switch for controlling said mechanism to remove resistance from the circuit, a second switch for controlling said mechanism to insert resistance in the circuit, a third switch and mechanism associated therewith for opening the motor-circuit, said second and third switches being arranged so that if the second switch be operated and then after an interval the third switch be operated the motor will come to rest gradually, whereas if the third switch be alone operated the motor will be brought to rest suddenly for an emergency stop, substantially as described.

16. The combination with a main motor and a starting resistance therefor, of an auxiliary motor and the starting resistance therefor, mechanism for cutting the starting resistance of the auxiliary motor into and out of circuit, a switch for controlling said mechanism, mechanism for cutting the starting resistance of the main motor into and out of circuit, a second switch for controlling said mechanism to remove resistance from circuit, a third switch for controlling said mechanism to insert resistance in circuit, and a fourth switch and mechanism associated therewith for opening the circuit through the main motor, substantially as described.

17. The combination with a solenoid and the core thereof, of a switch adapted to be actuated when the core is in the retracted position, an electromagnet and a part controlled thereby adapted to be interposed in the path of said core to prevent the same from moving to the retracted position to actuate said switch until the part controlled by said electromagnet is withdrawn from the path of the said core, substantially as described.

In witness whereof I have hereunto subscribed my name in the presence of two witnesses.

CHARLES A. DRESSER.

Witnesses:
W. CLYDE JONES,
M. R. ROCHFORD.